Nov. 12, 1968     K. H. FISCHBECK     3,410,203
NON-IMPACT PRINTER EMPLOYING LASER
BEAM AND HOLOGRAPHIC IMAGES
Filed Feb. 1, 1967

Inventor:
KENNETH H. FISCHBECK
By John T. O'Halloran
Attorney

3,410,203
NON-IMPACT PRINTER EMPLOYING LASER BEAM AND HOLOGRAPHIC IMAGES
Kenneth H. Fischbeck, Princeton, N.J., assignor to Radio Corporation of America, a corporation of Delaware
Filed Feb. 1, 1967, Ser. No. 613,282
12 Claims. (Cl. 101—1)

ABSTRACT OF THE DISCLOSURE

A non-impact printing apparatus includes a hologram mounted adjacent a printing surface. The hologram contains a holographic image of the data to be printed whereas the printing surface contains toner to record the data to be printed. Light energy, such as that derived from a laser, is beamed onto the hologram to project a real image of the data to be printed onto the toner on the printing surface. The radiant energy in the laser beam fuses the toner to the printing surface in the shape of the printed data.

Summary of the invention

A non-impact printer comprises a hologram having a holographic image of data to be printed that is positioned adjacent a printing surface having toner spread thereon. A laser beam is projected onto the hologram to cause a real image of the data to be fused onto the toner on the printing surface to print the data.

Detailed description

Figure 1:
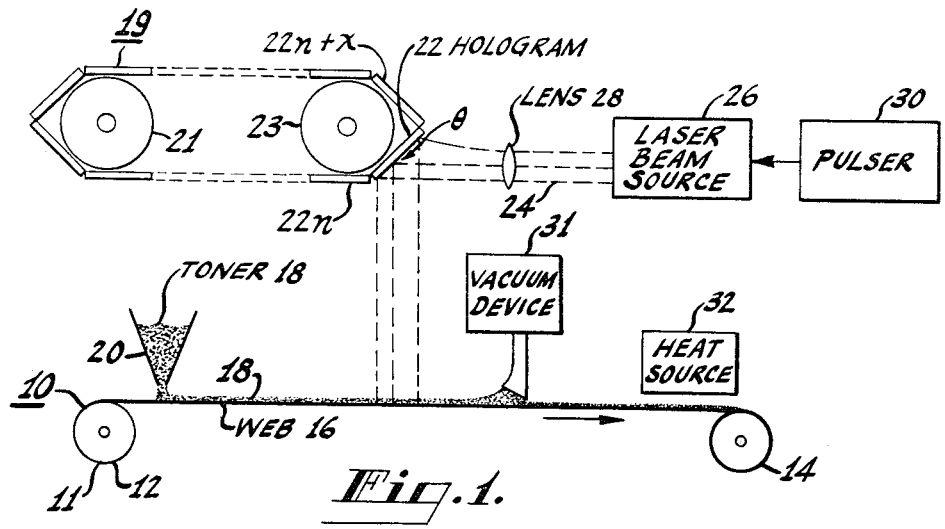
FIGURE 1 is a schematic block diagram of the printing apparatus embodying the invention.

Referring now to FIGURE 1, a non-impact printer 10 embodying the invention includes a transport mechanism 11, shown in schematic form, and including a pair of rollers 12 and 14 between which a printing surface, such as a paper web 16 is mounted. The paper web 16 is initially rolled on the roller 12 and then is moved by the transport mechanism 11 in the direction of the arrow shown in FIGURE 1, to be taken up by the take-up roller 14. The paper web 16 is sprinkled with toner 18 applied from a hopper 20 mounted above the paper web 16 and adjacent the roller 12. The toner 18 may for example comprise a typical electrofax toner such as a fine dry powder of polystyrene particles containing carbon black. The toner 18 may also comprise wax particles containing carbon black. The hopper 20 opening is adjusted to apply a fine coating of toner 18 particles to the printing surface of the paper web 16.

Mounted on a transport device 19 at an angle $\theta$ to the horizontal is a reflective hologram 22. The reflective hologram 22 is the first hologram in a series of reflective holograms $22_n \ldots 22_{n+x}$ that are mounted on the transport device 19, shown schematically in FIGURE 1. The holograms 22, $22_n \ldots 22_{n+x}$ are articulated to form a loop to be rotated by rollers 21 and 23 to successively assume the angle $\theta$ to the paper web 16. The hologram 22 includes a holographic image of the data to be printed on the printing surface of the paper web 16. Each successive hologram $22_n$, $22_{n+1}$, etc., includes a holographic image of different data. Thus the serial holograms may for example comprise the successive pages of a book or the like. Alternatively, the hologram 22 may be merely a single hologram mounted at the angle $\theta$ to the horizontal and consequently mounted at the same angle to the paper web 16.

A monochromatic, coherent beam of light 24 derived from a laser source 26 is applied to the hologram 22. If necessary a lens system, shown schematically as a single convex lens 28, may be positioned intermediate the laser source 26 and the hologram 22 to focus the beam of light 24 onto the hologram 22. The laser source 26 may for example comprises a gas laser such as a carbon dioxide ($CO_2$) laser or any of the other well-known lasers. A carbon dioxide ($CO_2$) laser is particularly suitable because such a laser produces a light beam having a power level of up to one kilowatt. Such a power level is capable of fusing any of the well-known toners onto the surface of the paper web 16. The toner 18 exhibits a melting temperature lower than the kindling temperature of the paper web 16. A pulser 30, is included in the printer 10 to pulse the laser 26 to produce discontinuities in the light beam 24 so that the hologram 22 is illuminated only at the angle $\theta$ to the horizontal. Hence no print smearing occurs on the paper web 16.

Positioned above the paper web 16 and adjacent the take-up roller 14 is a vacuum sweeper device 31. The vacuum sweeper device 31 includes brushes that gather the excess unfused toner 18 from the printing surface 16 which is then removed by suction. Positioned adjacent and subsequent to the vacuum cleaner device 31 is a source of radiant heat 32 for fixing the toner 18 that is fused onto the surface of the paper web 16.

Figure 2:
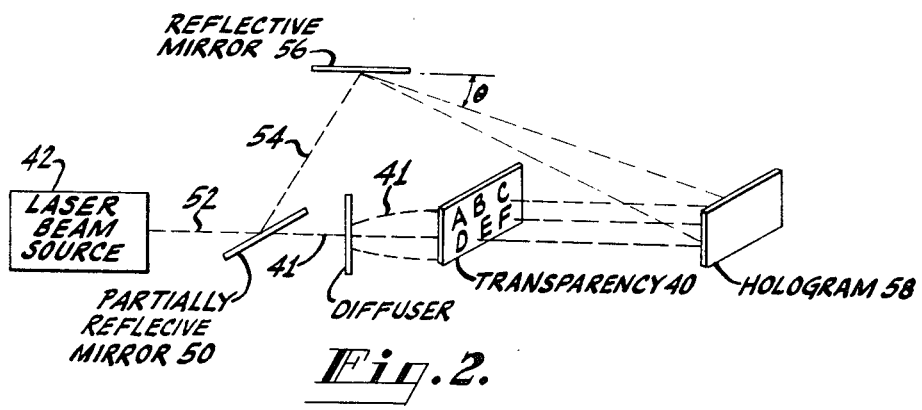
FIGURE 2 is a schematic block diagram illustrating a technique for preparing a hologram to be used in the printing apparatus of FIGURE 1.

Referring now to FIGURE 2, there is illustrated a schematic block diagram of the apparatus required for the preparation of a hologram to be used in the printer 10 of FIGURE 1. To prepare a holographic image of data to be printed, the data is first photographer and the film developed into a transparency 40. Such a transparency 40 may for example be derived from an electronic photocomposition system such as the RCA Videocomp 70/820 which is presently being offered for sale. The Videocomp system causes character images in a line of print to appear on the face of a display device, such as a cathode ray tube, under the command of a computer. The displayed characters are then photographed and the photograph is processed into the transparency 40.

The transparency 40 is positioned so that an information beam of light 41 from a laser source 42 is projected thereon. The information beam 41 may first be scattered by a diffuser 46, that may for example be opal glass. Positioned intermediate the diffuser 46 and the laser 42 is a partially reflective mirror 50 that splits the light beam 52 from the laser 42 into a reference beam 54 and the information beam 41. The reference beam 54 is directed onto a mirror 56 to provide a reference patth from the laser source 42 to a photographic film or hologram 58. The mirror 56 is positioned so that the reference beam 54 forms an angle of $\theta$ with the horizontal, which angle is the same as the angle in FIGURE 1. The information beam 41 travels through the transparency 40 directly to the hologram 58. The combination of the reference beam 54 and the information beam 41 traveling by different paths to the hologram 58 produces interference patterns on the hologram 58 to cause the print data in the transparency 40 to be recorded as a holographic image on the hologram 58. The hologram 58 is then developed and coated with a reflective material, such as silver, to produce a reflective hologram. The coating of silver may for example be done by sputtering techniques, such as bombarding silver by an electron beam and attracting the separated silver particles onto the surface of the hologram 58 by an electric field.

To avoid the deposition step in producing a reflective hologram, the hologram 58 may also, for example, comprise a plate of copper that is coated by any one of a variety of photoresistive materials that are commercially available, such as "KPR" (Kodak Photoresist). The photoresist is hardened onto the surface of the hologram 58 at the places where light from the reference 54 and information 41 beams impinge. The holographic surface 58 is then etched by an etchant such as ferric chloride or another dilute acid. Where the photoresist has hardened, the copper is not etched and a relief pattern is thereby provided which is necessary for reconstructing a real image of the printing data from the holographic image.

*Operation*

When the holograms 22 of data to be printed on the web of paper 16 in FIGURE 1 are prepared, they are mounted on the transport device 19 in series. The paper transport mechanism 11 is operated to transport the web of paper 16 beneath the hopper 20 so that the toner 18 in the hopper 20 is sprinkled onto the web 16 to produce a fine coating of powdered toner. The laser source 26 is energized by the pulser 30 to project a beam of radiant energy 24 onto the reflective hologram 22. The light reflected from the hologram 22 contains an actual or real image of the printed data appearing on the transparency 40 of FIGURE 2. The energy in the reflected light beam melts and fuses the toner 18 onto the paper web 16 in the image of the printed data. The pulsing of the laser source 26 in fractions of a microsecond avoids smearing even though the paper web 16 motion is uninterrupted. The next hologram $22_n$ is then positioned at the angle $\theta$ to cause the data contained thereon to be printed on the paper web 16. Each hologram $22_{n+}$ ... in turn causes a real image of the printed data to be fused in succession onto the web 16. The excess or unfused toner is removed by the vacuum sweeper device 31 and the fused toner is fixed onto the paper 16 by heat from the source 32.

The printer 10 exhibits decided advantages over existing impact printers. By providing the serial holograms 22, sequential pages in a book, newspaper, etc., may be printed without changing printing plates. The holograms utilized in such non-impact printing last a comparatively time because the image is derived from reflected light rather than pressing or impacting a plate onto a surface. The printer 10 prints lighter or darker relatively easily merely by increasing or decreasing the coating depth of the toner 18 and the energy in the light beam from the laser source 26. Additionally when extra runs are desired, the holograms 22 may be rapidly set up to run the additional copies. No special inks are required since the toner 18 is readily available Electrofax toner. In impact printing, it is to be recalled that special inks must be prepared that not only must be initially attracted to the printing plate so that they will not run off but must be even mor attracted to the paper surface so tthat the image can be printed. In such impact printing, not only is the ink costly but the lightness and darkness of the printing is difficult to control.

Thus in accordance with the invention a non-impact printer is provided that prints by utilizing the properties of a reflective hologram to produce an actual image of data in the form of light, and consequently heat, variations so as to fuse toner onto a printing surface by melting the toner. Such non-impact printing is readily conducive to making long or short printing runs with a minimum of expense in starting up or stopping the runs.

What is claimed is:
1. A non-impact printer for printing data including alphanumeric characters and symbols on a surface comprising in combination,
   a hologram containing a holographic image of said data,
   a laser for applying a beam of light onto sand hologram to project a real image of said printing data onto said surface, and
   recording means provided on said surface to receive the radiant energy contained in the projection of said real image to fuse said recording means in the shape of said printing data onto said surface.
2. A printer in accordance with claim 1 wherein said recording means comprises a dry powdered toner deposited on said printing surface.
3. A printer in accordance with claim 2 that further includes a vacuum sweeper device for removing the unfused excess toner.
4. A printer in accordance with claim 1 wherein said hologram comprises a reflective hologram.
5. A printer in accordance with claim 2 wherein said aforementioned hologram is mounted at a predetermined angle to said beam of light.
6. A printer in accordance with claim 5 that further includes a plurality of articulated reflective holograms coupled to said aforementioned hologram.
7. A printer in accordance with claim 6 wherein said plurality of articulated holograms are mounted on a transport device to be positioned successively at said predetermined angle to said beam of light.
8. A printer in accordance with claim 7 wherein said plurality of articulated holograms comprise holographic images of successive pages of data to be printed.
9. A printer in accordance with claim 2 wherein said dry powdered toner melts at a temperature lower than the kindling temperature of said printing surface.
10. A printer in accordance with claim 4 wherein said hologram comprises a reflective printing plate having a holographic image of said printed data etched thereon.
11. In a printing system the combination comprising,
    a plurality of articulated holograms with each containing a holographic image of alphanumeric characters and symbols corresponding to a printed page,
    a surface having recording means for recording said alphanumeric characters and symbols,
    a laser for producing a beam of coherent, monochromatic light,
    means for successively positioning each of said holograms in front of said laser so that said light beam successively projects a real image of said alphanumeric characters and symbols from each of said holograms onto said recording surface, and
    means for successively positioning different portions of said recording surface to receive successive projections of said real images so as to record said alphanumeric characters and symbols page by page on said recording surface.
12. The combination comprising means providing a beam of unshaped radiant energy,
    a hologram containing holographic images positioned to intercept said beam of unshaped radiant energy for shaping said beam of radiant energy into representations of said holographic images,
    a recording surface spaced a predetermined distance from said hologram,
    means providing toner deposited on said recording surface, and
    means for projecting said beam of shaped radiant energy onto said recording surface by radiating said beam onto said recording surface so that the heat energy in said radiant beam melts said toner and fuses said toner onto said surface in the shape of said images.

(References on following page)

References Cited

UNITED STATES PATENTS

| | | | |
|---|---|---|---|
| 2,503,758 | 4/1950 | Murray | 150—65.1 XR |
| 3,207,897 | 9/1965 | Limberger | 101—409 XR |
| 2,841,461 | 7/1958 | Gleason | 101 |
| 3,154,371 | 10/1964 | Johnson | 346—108 |
| 3,175,196 | 3/1965 | Lee et al. | 176—6.6 XR |
| 3,220,013 | 11/1965 | Harris | 346—107 |
| 3,226,696 | 12/1965 | Dove | 178—6.6 |
| 3,256,524 | 6/1966 | Stauffer | 346—76 |
| 3,314,073 | 4/1967 | Becker | 250—199 XR |

OTHER REFERENCES

IBM Technical Disclosure Bulletin, vol. 7, No. 3, August 1964, article by Roshon et al. entitled, "Printing by Means of a Laser Beam," p. 224 only.

IBM Technical Disclosure Bulletin, vol. 9, No. 3, August 1966, article by Erdos entitled, "Holographic Information Storage and Retrieval," p. 291 only.

ROBERT E. PULFREY, *Primary Examiner.*

EDGAR S. BURR, *Assistant Examiner.*